(12) United States Patent
McLamb

(10) Patent No.: US 9,106,460 B1
(45) Date of Patent: Aug. 11, 2015

(54) RUNNING DISPARITY COMPUTATION PREDICTOR

(75) Inventor: Jeffrey T. McLamb, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 498 days.

(21) Appl. No.: 13/181,060

(22) Filed: Jul. 12, 2011

(51) Int. Cl.
  *H04L 25/10* (2006.01)
  *H04L 25/02* (2006.01)
  *H04L 1/00* (2006.01)

(52) U.S. Cl.
  CPC .......... *H04L 25/0284* (2013.01); *H04L 1/0083* (2013.01)

(58) Field of Classification Search
  CPC ....... H04L 1/0083; H04L 1/42; H04L 1/0072; H04L 25/0284; H04L 25/061; H04L 25/4915; H04L 1/0061
  USPC ................. 370/216, 242, 300, 464, 465, 476; 709/224, 236; 341/50, 55, 63, 106
  See application file for complete search history.

(56) References Cited

U.S. PATENT DOCUMENTS

| | | | | |
|---|---|---|---|---|
| 5,663,724 | A * | 9/1997 | Westby | 341/59 |
| 6,886,126 | B1 * | 4/2005 | Grivna et al. | 714/752 |
| 7,076,724 | B2 * | 7/2006 | Cole et al. | 714/784 |
| 7,123,173 | B1 * | 10/2006 | Grivna | 341/58 |
| 7,518,534 | B2 * | 4/2009 | Grivna | 341/59 |
| 2002/0046276 | A1 * | 4/2002 | Coffey et al. | 709/224 |
| 2006/0013293 | A1 * | 1/2006 | Hirsch | 375/220 |
| 2006/0095613 | A1 * | 5/2006 | Venkata et al. | 710/62 |

OTHER PUBLICATIONS

Various Authors, "Multiplexer," Dec. 13, 2010, Wikipedia.org, All Pages.*
Fibre Channel, from Wikipedia, the free encyclopedia, http://en.wikipedia.org/widi/Fibre_Channel, date retrieved, Jun. 29, 2011.
Fibre Channel Network Protocols, from Wikipedia, the free encyclopedia, http://en.wikipedia.org/wiki/Fibre_Channel_network_protocols, date retrieved, Jul. 12, 2011.
Fibre Channel Frame, from Wikipedia, the free encyclopedia, http://en.wikipedia.org/wiki/Fibre_channel_frame, date retrieved, Jul. 12, 2011.
Fibre Channel 8B/10B encoding, from Wikipedia, the free encyclopedia, http://en.wikipedia.org/wiki/Fibre_Channel_8B/10B_encoding, date retrieved, Jul. 12, 2011.
Eight-to-Fourteen Modulation, from Wikipedia, the free encyclopedia, http://en.wikipedia.org/wiki/eight-to-fourteen_modulation, date retrieved, Jul. 12, 2011.
64b/66b Encoding, from Wikipedia, the free encyclopedia, http://en.wikipedia.org/wiki/64b/66b_encoding, date retrieved, Jul. 12, 2011.
8b/10b Encoding, from Wikipedia, the free encyclopedia, http://en.wikipedia.org/wiki/8b/10b_encoding, date retrieved, Jun. 21, 2011.

* cited by examiner

*Primary Examiner* — Curtis A Alia
(74) *Attorney, Agent, or Firm* — Hamilton, Brook, Smith & Reynolds, P.C.

(57) ABSTRACT

A running disparity computation predictor is configured to analyze a frame of data, a control value, and an input tracking value and generate a predicted output tracking value. A frame selector is configured to generate an encoded frame of data based on this predicted output tracking value. A frame insertion module is configured to insert the encoded frame of data into a data stream wherein the predicted output tracking value matches an output tracking value generated by the data stream. This combination of elements can bypass an encoder built into a Hard IP block or proprietary hardware when the running disparity value is required to select control words.

18 Claims, 2 Drawing Sheets

RUNNING DISPARITY COMPUTATION PREDICTOR

BACKGROUND

8B/10B encoding is a line code that maps 8-bit symbols to 10-bit symbols in order to maintain a direct-current (DC) balanced signal. The difference between the count of 1s and 0s in a string of at least 20 bits will be no more than 2 at any time under 8B/10B encoding. In addition, 8B/10B encoding does not allow for strings of over five 1s or 0s in a row. 8B/10B encoding achieves this DC balanced signal by maintaining a running disparity. The running disparity keeps track of whether more 1s or 0s are in the signal at any given time. If the running disparity indicates there are more 1s, the 8B/10B protocol calls for a data frame with more 0s to be sent. Conversely, if the running disparity indicates there are more 0s, the 8B/10B protocol calls for a data frame with more 1s to be sent.

Fibre Channel is a gigabit-speed data transmission protocol that can be applied in storage networking. Fibre Channel uses an 8B/10B encoding. For data transmission protocols such as Fibre Channel that require different end-of-frame code words to terminate a transmission frame based on the current running disparity, a solution is to compute the 8B/10B encoding of the output data early in the transmission pipeline when it is still possible to change the outgoing data. This precludes using built-in 8B/10B circuitry packaged with transceiver hard IP blocks available in most high-end field-programmable gate arrays (FPGAs) or licensed for "black box" use in application-specific integrated circuits (ASICs). Built-in 8B/10B encoders cannot support protocols such as Fibre Channel because they are attached too deep within the transmission pipeline to allow for control logic to switch the terminator when needed. In these cases, a separate 8B/10B block must be implemented, wasting circuitry already in place and incurring unnecessary additional expense from the extra logic gates.

BRIEF DESCRIPTION OF THE DRAWINGS

A more particular description of example embodiments of the invention, as illustrated in the accompanying drawings, follows in which like reference characters refer to the same parts throughout the different views. The drawings are not necessarily to scale, emphasis instead being placed upon illustrating embodiments of the present invention.

DETAILED DESCRIPTION

Figure 1:
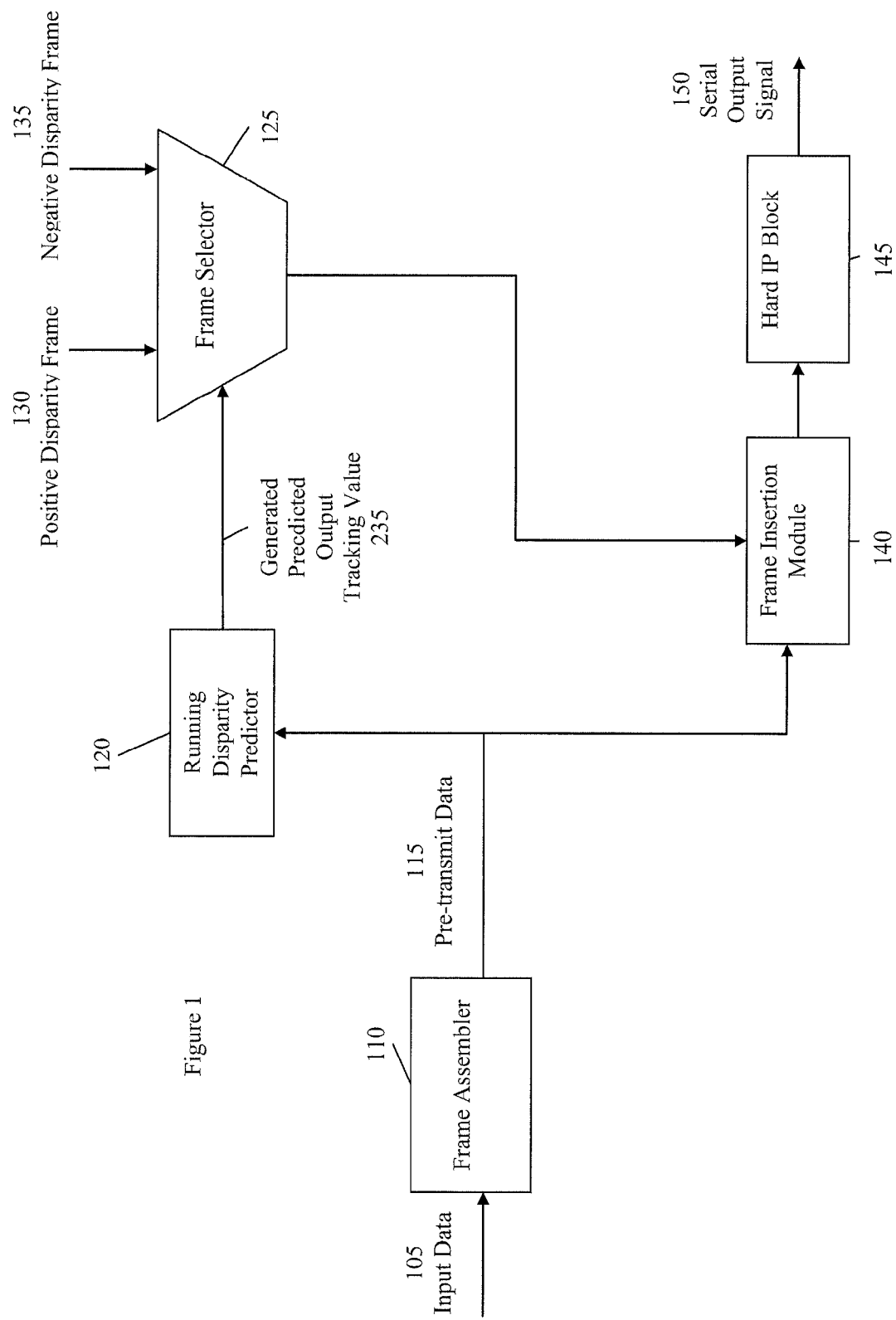
FIG. 1 is a diagram of an encoding scheme utilizing a running disparity computation predictor.

A description of example embodiments follows.

Hard IP blocks feature encoding schemes that can save logic resources, but often these Hard IP blocks are inflexible when it comes to modifying information after it is in a transmission pipeline. One example of this inflexibility is the interaction between the 8B/10B encoders of Hard IP Blocks and a Fibre Channel frame assembler. The Fibre Channel frame assembler, as an example, requires control words to be changed based on the value of a running disparity bit. When the 8B/10B encoding on a Hard IP block is used, data cannot be changed once it is already in the transmission pipeline, so the running disparity bit must be determined predicatively to send the correct control word to the Hard IP block. In one embodiment, a running disparity computation predictor predicts a resulting disparity based on incoming frames of data in order to choose the correct control words to send into the Hard IP block's transmission pipeline.

In some embodiments, an 8B/10B running disparity computation scheme predicts a resultant 8B/10B running disparity from an arbitrary number of unencoded input data bytes in parallel without performing a full 8B/10B encoding. In some embodiments, the scheme takes advantage of the fact that only 127 of the 268 possible values of each 8-bit input byte of data and control characters result in toggling the current running disparity. The scheme can quickly and efficiently calculate whether each byte of input will toggle the initial running disparity by using lookup tables, which in some situations include discrete logic gates in an application-specific integrated circuit (ASIC), hardware look-up tables (LUTs) in a field-programmable gate array (FPGA), and software embodiments. The results of this calculation can be exclusive-ORed together with the initial running disparity to compute the resultant running disparity, without needing to run the full 8B/10B encoding algorithm.

Without these embodiments, a separate 8B/10B encoder that supports changing control words based on the running disparity would have to be implemented. Built-in full 8B/10B encoders do not implement protocols, such as Fibre Channel, that require changing control words based on the running disparity bit. Control words that are changed based on the running disparity should know the running disparity before the data enters the full 8B/10B encoder, or the full 8B/10B encoder should be able to modify the control word itself. Unfortunately, the full 8B/10B encoders can be Hard IP blocks, or proprietary hardware that cannot be modified, that do not support modifying control words based on the running disparity or modifying data within the encoder's pipeline. These embodiments take advantage of the Hard IP full 8B/10B encoders by predicting the running disparity and then modifying the transmission data before the full 8B/10B encoder receives it. This uses full 8B/10B encoders, available in many FPGAs or ASIC IP, which saves logic resources and cost.

This approach allows the correct end-of-frame terminator to be inserted anywhere in the transmit pipeline it is needed. It also supports any other data manipulation that requires predictive knowledge of the 8B/10B running disparity before the full 8B/10B computation is performed. This approach can predict the running disparity of other encoding schemes, such as, but not limited to, eight-to-fourteen modulation, EFM-Plus, and 64B/66B encoding.

FIG. 1 is a block diagram of one configuration of an encoding scheme. A system 100 receives input data 105 into a frame assembler 110, which, in this example, is implementing the Fibre Channel protocol. The frame assembler 110 could be implemented in protocols other than Fibre Channel. Greater advantages are reached when the frame assembler 110 changes control words based on a running disparity bit or other input tracking value.

The frame assembler 110 sends the data in pre-transmit data 115 to a Running Disparity Predictor 120 and a Frame Insertion Module 140. The Running Disparity Predictor 120 analyzes the pre-transmit data 115 and outputs a generated predicted output tracking value 235 to a frame selector 125. The frame selector 125 chooses either a positive disparity frame 130 or a negative disparity frame 135 based on a generated predicted output tracking value 235. The frame selector 125 may select the positive disparity frame 130 or the negative disparity frame 135 to properly encode an end-of-frame code word. The frame selector 125 may select an end of frame (EOF) control word. The frame selector 125 then transmits its output to a Frame Insertion Module 140, which receives it and inserts it in the appropriate place in the pre-transmit data 115.

The Frame Insertion Module 140 outputs to a Hard IP Block 145. The Hard IP Block then outputs to a serial output signal 150. A Hard IP block 145 is a hardware implemented module that can contain encoders such as a full 8B/10B encoder. However, Hard IP blocks can be proprietary and may not be modifiable. Therefore, the Hard IP block 145 may not be able to correctly implement a variation of an encoding on its own, such as the Fibre Channel variation of the 8B/10B encoding.

Figure 2:
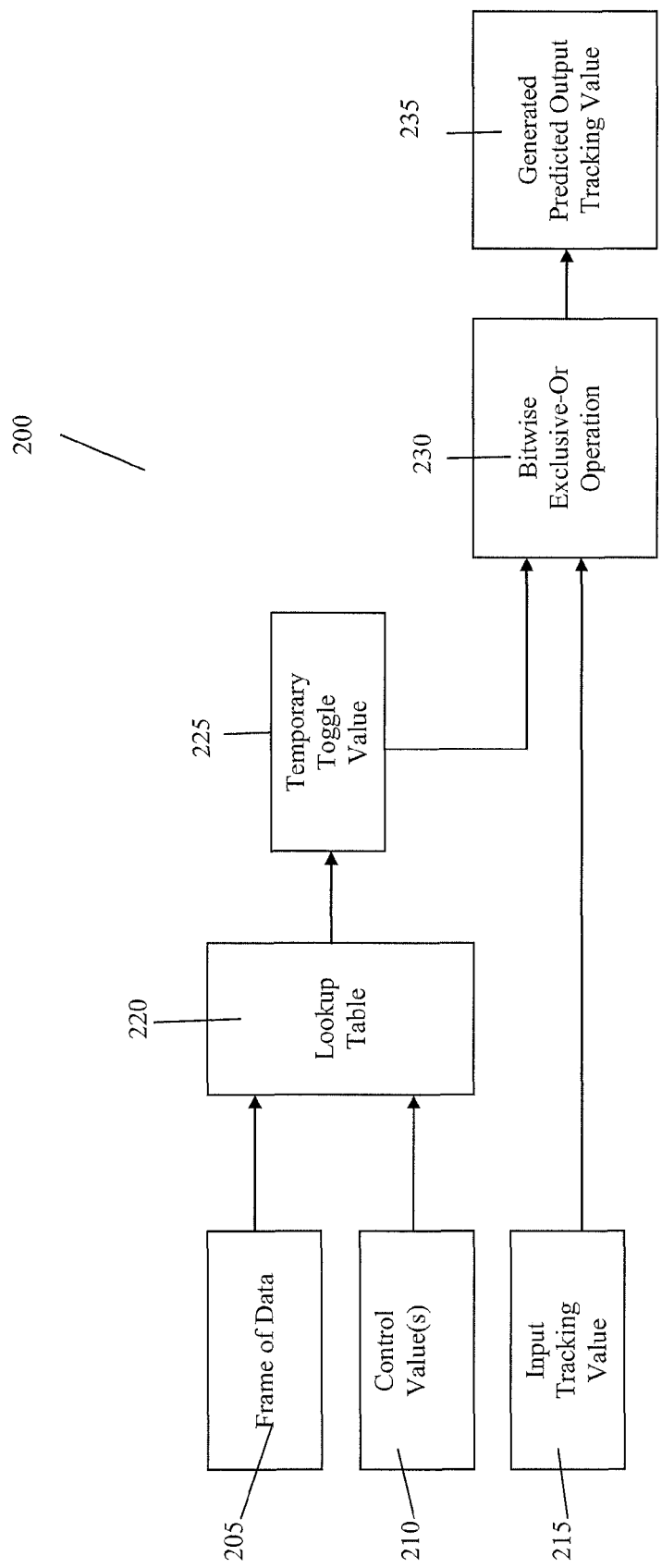
FIG. 2 is a more detailed diagram of the running disparity computation predictor.

FIG. 2 is a more detailed diagram of a running disparity computation predictor. The running disparity computation predictor 200 receives a frame of data 205, control value(s) 210, and an input tracking value 215. The frame of data 205 here could be communication between network storage devices or components. The frame of data 205 could also be from any inter-device network, host computer, a disk drive, an optical medium, wireless communication, a computer peripheral device, or any other protocol that uses an encoding scheme, such as 8B/10B encoding. The frame of data 205 and control value(s) 210 are received by a lookup table 220. The lookup table can receive multiple frames in the frame of data 205 and multiple control value(s) 210 at once. The lookup table 220 processes the frame of data 205 and control value(s) 210 and transmits a temporary toggle value 225. The lookup table 220 may output a plurality of temporary toggle values 225. The lookup table 220 can be implemented as discrete logic gates in an ASIC, as hardware LUTs in an FPGA, or as software.

The temporary toggle value 225 and the input tracking value 215 are processed by a Bitwise Exclusive-Or Module 230. The Bitwise Exclusive-Or Module 230 performs an exclusive-or operation on each bit inputted to it. If there are multiple temporary toggle values 225, the Bitwise Exclusive-Or Module 230 will process all of them sequentially. The Bitwise Exclusive-Or Module then outputs a Generated Predicted Output Tracking Value 235, which serves as the output for the running disparity computation predictor 200.

Appendix A shows an embodiment of the lookup table 220 in Verilog code.

Thus, it can now be understood that a method can comprise receiving a frame of data, a control value, and an input tracking value, analyzing the frame of data, control value and the input tracking value to generate a toggle value representing whether the input tracking value should be toggled, and generating a predicted output tracking value based on the input control value and the toggle value.

A system can comprise a running disparity predictor configured to analyze a frame of data, a control value, and an input tracking value and generate a predicted output tracking value. The system can also comprise a frame selector configured to generate an encoded frame of data based on the predicted output tracking value. The system can further comprise a frame insertion module configured to insert the encoded frame of data into a data stream wherein the predicted output tracking value matches an output tracking value generated by the data stream.

A system can also comprise a hard IP block configured to encode a frame of data, wherein the hard IP block is unable to dynamically change control words within the frame of data based on the input tracking value and a data flow path that routes the frame of data through the running disparity predictor to generate the predicted output value, routes the general predicted output value to the frame selector to generate the encoded frame of data, routes the encoded frame of data to the frame insertion module to insert the encoded frame of data into the data stream, and routes the data stream into the hard IP block.

A computer program product can comprise a computer usable medium having a computer readable program code embodied therein, said computer readable program code adapted to be executed to implement a method comprising receiving a frame of data, a control value, and an input tracking value; analyzing the frame of data, control value and the input tracking value to generate a toggle value representing whether the input tracking value should be toggled; and generating a predicted output tracking value based on the input control value and the toggle value.

A system or method can encode the frame of data based on the predicted output tracking value. The frame selector can be configured to encode the data based on the predicted output tracking value. The frame selector may include a demultiplexer.

A system or method can receive the frame of data from a data stream. It can insert the encoded frame of data into a data stream wherein the predicted output tracking value matches an output tracking value generated by the data stream.

A system or method may operate with a Fibre Channel data stream, wherein the frame of data contains an end of frame control, and the end of frame control is selected based on the predicted tracking value. The frame selector can be configured to generate an encoded frame of data based on the predicted output tracking value in accordance with the Fibre Channel protocol, and the frame insertion module can be configured to insert the encoded frame of data into a Fibre Channel transmission pipeline.

The predicted output tracking value can be based on the result of a bitwise exclusive or operation on a temporary toggle value, based on analyzing the frame of data and the control value with a lookup table, and the toggle value.

The running disparity predictor can be configured to generate a predicted output tracking value and the frame selector can be configured to generate an encoded frame of data based on the predicted output tracking value in accordance with at least one of 8B/10B encoding, 64B/66B encoding, EFMPlus, and eight-to-fourteen modulation.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   receiving a frame of data of a data stream, a control value, and an input tracking value;
   analyzing the frame of data, the control value and the input tracking value to generate a toggle value representing whether the input tracking value should be toggled;
   generating a predicted output tracking value based on the input control value and the toggle value;
   selecting one of a positive disparity frame or a negative disparity frame to be a selected frame; and
   encoding a disparity of a control word to be inserted into the data stream, the encoded disparity of the control word being based (i) the predicted output tracking value and (ii) the selected frame.

2. The method of claim 1 further comprising:
   encoding the frame of data based on the predicted output tracking value.

3. The method of claim 2 further comprising:
transmitting the control frame of data to a hard IP block.

4. The method of claim 1 further comprising:
inserting the frame of data into the data stream wherein the predicted output tracking value matches an output tracking value generated by the data stream.

5. The method of claim 1 further comprising:
the frame of data is received from a Fibre Channel frame assembler, wherein the frame of data includes an end of frame control; and
selecting an encoding for the end of frame control based on the predicted output tracking value.

6. The method of claim 1 wherein the frame of data is received from a data streaming device.

7. The method of claim 1 wherein the predicted output tracking value is based on the result of a bitwise exclusive OR operation on a temporary toggle value, based on analyzing the frame of data and the control value with a lookup table, and the temporary toggle value.

8. The method of claim 1, wherein the selected disparity is either positive or negative.

9. A system comprising:
a running disparity predictor configured to analyze a frame of data of a data stream, a control value, and an input tracking value and generate a predicted output tracking value;
a frame selector configured to (i) select one of a positive disparity frame or a negative disparity frame to be a selected frame, and (ii) encode a disparity of a control word, the encoded disparity of the control word based on the predicted output tracking value and (ii) the selected frame; and
a frame insertion module configured to insert the control frame of data into the data stream as an encoded version of the frame of data of the data stream based on the predicted output tracking value, wherein the predicted output tracking value matches an output tracking value generated by the data stream.

10. The system of claim 9 further comprising:
a hard IP block configured to encode the frame of data, wherein the hard IP block is unable to dynamically change control words within the frame of data based on the input tracking value; and
a data flow path that routes the frame of data through the running disparity predictor to generate the predicted output value, routes the general predicted output value to the frame selector to generate the control frame of data, routes the control frame of data to the frame insertion module to insert the control frame of data into the data stream, and routes the data stream into the hard IP block.

11. The system of claim 9 wherein the frame selector includes a demultiplexer.

12. The system of claim 9 wherein the frame selector is configured to generate the control frame of data based on the predicted output tracking value in accordance with the Fibre Channel protocol, and wherein the frame insertion module inserts the control frame of data into a Fibre Channel transmission pipeline.

13. The system of claim 9 wherein the running disparity predictor is configured to generate the predicted output tracking value and the frame selector is configured to generate the control frame of data based on the predicted output tracking value in accordance with at least one of 8B/10B encoding, 64B/66B encoding, EFMPlus, and eight-to-fourteen modulation.

14. The system of claim 9 wherein the frame insertion module is configured to insert the control frame of data into the data stream wherein the predicted output tracking value matches the output tracking value generated by the data stream.

15. The system of claim 9 wherein the frame of data is received from a data streaming device.

16. The system of claim 9 wherein the predicted output tracking value is based on the result of a bitwise exclusive OR operation on a temporary toggle value, based on analyzing the frame of data and the control value with a lookup table, and the toggle value.

17. A system comprising:
a running disparity predictor configured to analyze a frame of data of a data stream, a control value, and an input tracking value and generate a predicted output tracking value;
a frame selector configured to (i) select one of a positive disparity frame or a negative disparity frame to be a selected frame, and (ii) encode a disparity of a control word, the encoded disparity of the control word based on (i) the predicted output tracking value and (ii) the selected frame;
a frame insertion module configured to insert the control frame of data into the data stream wherein the predicted output tracking value matches an output tracking value generated by the data stream;
a hard IP block configured to encode the frame of data, wherein the hard IP block is unable to dynamically change control words within the frame of data based on the input tracking value; and
a data flow path that routes the frame of data through the running disparity predictor to generate the predicted output value, routes the general predicted output value to the frame selector to generate the control frame of data, routes the control frame of data to the frame insertion module to insert the control frame of data as an encoded version of the frame of data into the data stream, and routes the data stream into the hard IP block.

18. A computer program product comprising a non-transitory computer usable medium having a computer readable program code embodied therein, said computer readable program code adapted to be executed to implement a method comprising:
receiving a frame of data of a data stream, a control value, and an input tracking value;
analyzing the frame of data, the control value and the input tracking value to generate a toggle value representing whether the input tracking value should be toggled; and
generating a predicted output tracking value based on the input control value and the toggle value;
selecting one of a positive disparity frame or a negative disparity frame to be a selected frame; and
encoding a disparity of a control word to be inserted into the data stream, the encoded disparity of the control word being based on (i) the predicted output tracking value and (ii) the selected frame.

* * * * *